United States Patent
Morozumi

(10) Patent No.: US 11,807,026 B2
(45) Date of Patent: Nov. 7, 2023

(54) CARD ISSUING SYSTEM, COMPUTER-READABLE STORAGE MEDIUM STORING PRINT PROGRAM FOR CARD ISSUING SYSTEM, AND PRINTING METHOD OF CARD ISSUING SYSTEM

(71) Applicant: NIDEC SANKYO CORPORATION, Nagano (JP)

(72) Inventor: Shinya Morozumi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 160 days.

(21) Appl. No.: 17/535,963

(22) Filed: Nov. 26, 2021

(65) Prior Publication Data
US 2022/0169057 A1    Jun. 2, 2022

(30) Foreign Application Priority Data
Nov. 30, 2020    (JP) .................. 2020-198345

(51) Int. Cl.
*B41M 7/00*    (2006.01)
*G06F 3/12*    (2006.01)

(52) U.S. Cl.
CPC ......... *B41M 7/0036* (2013.01); *G06F 3/1208* (2013.01); *G06F 3/1242* (2013.01)

(58) Field of Classification Search
CPC ...... B41J 2/2114; B41J 11/0015; B41J 13/12; G06F 3/1208; G06F 3/1242; G06F 3/1253; B41M 7/00
See application file for complete search history.

(56) References Cited

U.S. PATENT DOCUMENTS

| | | | |
|---|---|---|---|
| 6,597,387 B1 * | 7/2003 | Chien | B41J 17/24 347/212 |
| 2004/0202794 A1 * | 10/2004 | Yoshida | B41M 7/0045 427/466 |
| 2005/0024416 A1 * | 2/2005 | Dentel | G06K 15/186 347/19 |

FOREIGN PATENT DOCUMENTS

JP    H10202926 A    8/1998

* cited by examiner

*Primary Examiner* — Julian D Huffman
(74) *Attorney, Agent, or Firm* — HAUPTMAN HAM, LLP

(57) ABSTRACT

According to an embodiment, a card issuing system which issues cards includes: a print image generation portion which generates print data to perform printing on the card; an overcoat image generation portion which generates overcoat data, which is data on an overcoat for the print data generated by the print image generation portion; and a printing portion which performs printing of the print data generated by the print image generation portion, and the overcoat data generated by the overcoat image generation portion on the card. The overcoat image generation portion generates the overcoat data with which an area where a design quality is required in the print data is subjected to overcoating based on pixels to be printed by the print data, and an area where durability is required in the print data is subjected to overcoating which covers the area.

10 Claims, 6 Drawing Sheets

CARD ISSUING SYSTEM, COMPUTER-READABLE STORAGE MEDIUM STORING PRINT PROGRAM FOR CARD ISSUING SYSTEM, AND PRINTING METHOD OF CARD ISSUING SYSTEM

RELATED APPLICATIONS

The present application claims priority to Japanese Application Number 2020-198345, filed Nov. 30, 2020, the disclosure of which is hereby incorporated by reference herein in its entirety.

BACKGROUND

Field of the Invention

At least an embodiment of the present invention relates to, in particular, a card issuing system for performing printing of an overcoat, a computer-readable storage medium storing a print program for the card issuing system, and a printing method of the card issuing system.

Description of the Related Documents

Conventionally, there exist printers which form an image by using an ink film, and achieving ink transfer on a recording sheet by applying a current to a heater element. With such printers, a printed part may be protected by performing printing of an overcoat, which is a transparent printing layer, to cover the other print areas.

For example, JPH10-202926 A describes a technique of designating only an area conforming to a print range, as an overcoat print area which covers over a recording sheet, at the time of starting the printing or at a final stage of the printing.

Meanwhile, in recent years, various types of cards are being issued. In such various types of cards, especially in the case of a premium card, a card being of a good design may be the means for appeal.

Here, in a card issuing device capable of performing printing of an overcoat on a card, depending on the type of the card, an overcoat printed part, even though the overcoat is transparent, is sometimes conspicuous. In other words, there are cases where a design quality of the card is impaired by the overcoat. However, the technology described in JPH10-202926 A is not capable of addressing the problems as described above.

At least an embodiment of the present invention has been conceived in view of the above situations, and aims to provide a card issuing system which performs printing of an overcoat that can protect a print without impairing the design quality of the card, thereby solving the above-described problems.

SUMMARY

A card issuing system according to one aspect of the present invention pertains to a card issuing system which issues cards, and includes: a print image generation portion which generates print data to perform printing on the card; an overcoat image generation portion which generates overcoat data, which is data on an overcoat for the print data generated by the print image generation portion; and a printing portion which performs printing of the print data generated by the print image generation portion, and the overcoat data generated by the overcoat image generation portion on the card, in which the overcoat image generation portion is characterized by generating the overcoat data with which an area where a design quality is required in the print data is subjected to overcoating based on pixels to be printed by the print data, and an area where durability is required in the print data is subjected to overcoating which covers the area.

By such a configuration, the print can be protected without impairing the design quality of the card.

The card issuing system according to one aspect of the present invention further includes a combining portion which combines at least either of a plurality of pieces of the print data and a plurality of pieces of the overcoat data, in which the overcoat image generation portion determines, for each piece of the print data to be combined among the plurality of pieces of the print data, whether to perform the overcoating based on the pixels, or perform the overcoating which covers the area, and the combining portion combines pieces of the overcoat data corresponding to the respective pieces of the print data.

By such a configuration, processing of the overcoat data can be made more efficient and faster.

The card issuing system according to one aspect of the present invention is characterized in that the overcoat image generation portion generates the overcoat data which applies, for the area where a design quality is required, an overcoat based on pixels of a character or a logo included in the print data.

By such a configuration, overcoating can be performed on the basis of the pixels of the character or the logo.

The card issuing system according to one aspect of the present invention is characterized in that the overcoat image generation portion acquires a setting of the card accommodated in a hopper, and changes a strength of a coating for each of the cards according to the acquired setting.

By such a configuration, the strength of the coating can be changed for each card according to the design quality requirement.

A computer-readable storage medium storing a print program according to a different aspect of the present invention pertains to a computer-readable storage medium storing a print program executed in a card issuing system which issues cards, in which the print program is characterized by causing the card issuing system to: generate print data to perform printing on the card; generate overcoat data, which is data on an overcoat for the print data that has been generated; generate the overcoat data with which an area where a design quality is required in the print data is subjected to overcoating based on pixels to be printed by the print data, and an area where durability is required in the print data is subjected to overcoating which covers the area; and perform printing of the print data and the overcoat data that have been generated.

By such a configuration, the print can be protected without impairing the design quality of the card.

A printing method according to another aspect of the present invention pertains to a printing method executed by a card issuing system which issues cards, in which the card issuing system is characterized by performing the method comprising: generating print data to perform printing on the card; generating overcoat data, which is data on an overcoat for the print data that has been generated; generating the overcoat data with which an area where a design quality is required in the print data is subjected to overcoating based on pixels to be printed by the print data, and an area where durability is required in the print data is subjected to overcoating which covers the area; and performing printing of the print data and the overcoat data that have been generated on the card.

By such a configuration, the print can be protected without impairing the design quality of the card.

According to at least an embodiment of the present invention, for an area where a design quality is required in the print data, overcoating is performed on the basis of the pixels to be printed by the print data, and for an area where durability is required, overcoating which covers the area is performed. By virtue of this feature, it is possible to provide a card issuing system which performs printing of an overcoat that can protect a print without impairing the design quality of the card.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Embodiments

Configuration of Card Issuing System X

Figure 1:
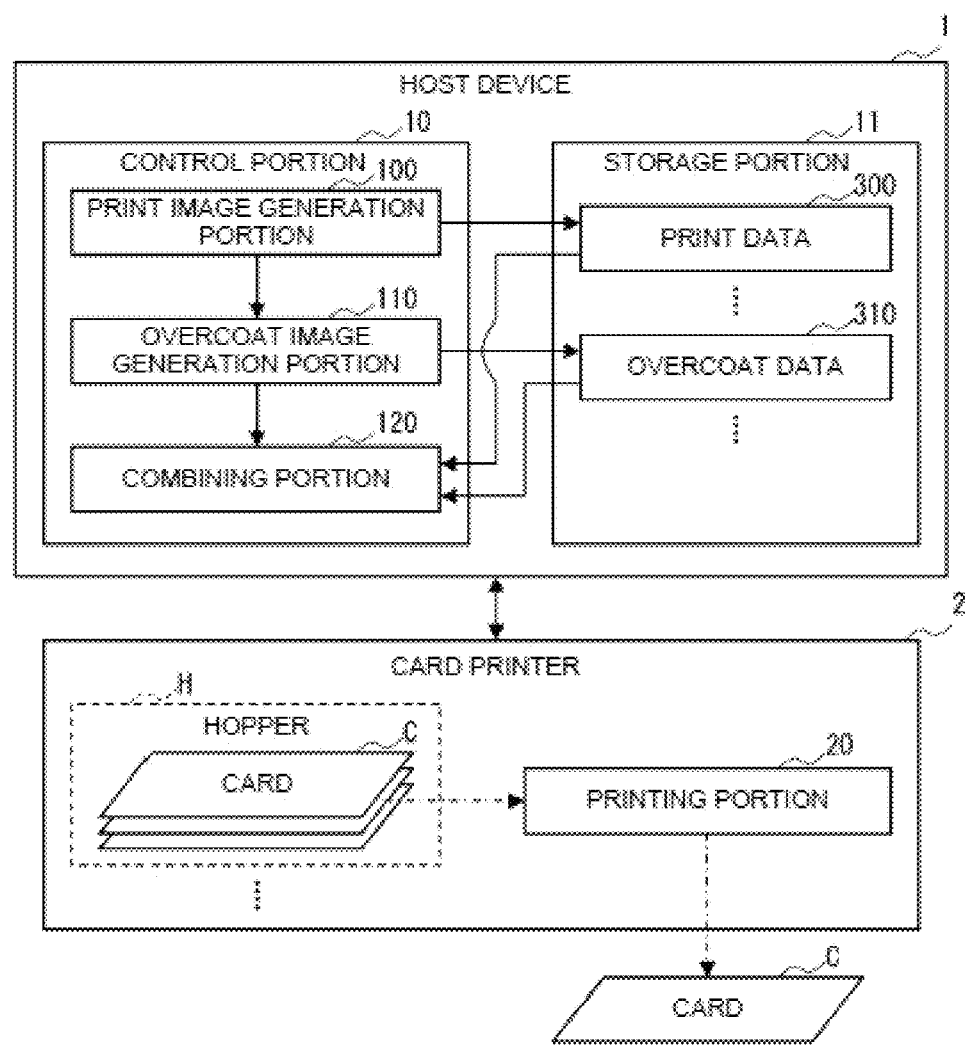
FIG. 1 is a diagram illustrating a system configuration of a card issuing system according to an embodiment of the present invention.

A configuration of a card issuing system X according to an embodiment of the present invention will be described with reference to FIG. 1. The card issuing system X is a card issuing system for issuing a new card C. Examples of the card issuing system X include an ATM having a card issuing function, a terminal at a kiosk, a ticket issuing system of transportation facilities, a loyalty card issuing system of a convenience store, etc, a member card issuing system of a retail store, a card issuing payment system of a game machine, and an entry/exit management system (hereinafter simply referred to as "ATM, etc.").

Specifically, the card issuing system X includes a host device 1, and a card printer 2. In the present embodiment, the host device 1 and the card printer 2 are connected to each other by a Universal Serial Bus (USB) or the like.

In the present embodiment, the host device 1 is an information processing device for controlling the card printer 2, and achieving each of the functions of the ATM, etc. Specifically, the host device 1 is, for example, a main body device of the ATM, etc., and includes a control arithmetic device, such as a personal computer (PC), a tablet terminal, or a mobile phone, for control. Specifically, the host device 1 executes application software (hereinafter simply abbreviated as "application") for achieving the functions of the card issuing system X. In the present embodiment, the host device 1 is connected to the card printer 2 to be controlled. Moreover, the host device 1 can also be connected to a network, various peripheral devices, and the like.

The card printer 2 corresponds to a printing-and-issuing printer and a card reader, etc., which print information necessary for a card C, and issue the card C, in response to an instruction from the host device 1. In the present embodiment, the card printer 2 and the host device 1 communicate with each other by, for example, a USB cable connected therebetween.

The card C adapted to the card issuing system X of the present embodiment is, for example, a contactless IC card, a contact-type IC card, and/or a magnetic card provided with a magnetic stripe. The card C has a rectangular shape having a thickness of approximately 0.7 mm to 0.8 mm, and is made of vinyl chloride, for example. When the card C is a magnetic card, for example, a magnetic stripe in which magnetic data is recorded is formed. Also, when the card C is a contactless IC card and/or a contact-type IC card, for example, an IC chip is incorporated therein. Here, both the IC chip and the magnetic stripe may be provided in the card C. Moreover, when the card C is a contactless IC card, a read/write (R/W) antenna for short-range wireless communication may be incorporated therein.

Note that the card C may be a polyethylene terephthalate (PET) card having a thickness of approximately 0.18 mm to 0.36 mm, or a paper card or the like having a predetermined thickness.

In the present system, the durability of an overcoat is changed depending on the above-described materials, the type of the card, and the like.

System Configuration of Host Device 1

As specific description of the system configuration, the host device 1 includes a control portion 10, and a storage portion 11, etc.

The control portion 10 is a control arithmetic portion including, for example, a central processing unit (CPU), a micro processing unit (MPU), a graphics processing unit (GPU), a digital signal processor (DSP), and an application specific integrated circuit (ASIC).

The control portion 10 also includes, as a System on Chip (SoC), a circuit and a physical interface, such as a chipset and an input/output (I/O) element, for enabling connection with an external device. The interface includes, for example, a general-purpose serial interface such as a USB, a parallel interface, and a digital video interface, for enabling connection with the card printer 2. Further, the control portion 10 may also include a network interface or the like for enabling connection with a network.

In the present embodiment, the control portion 10 functions as a print control portion which controls the card printer 2.

The storage portion 11 corresponds to a random-access memory (RAM), a read-only memory (ROM) including a flash memory and other non-volatile semiconductor memories, a solid state drive (SSD), a magnetic recording medium such as a hard disk drive (HDD), an optical recording medium such as an optical disk, and other non-transitory recording media. In the storage portion 11, control programs including an operating system (OS) and an application (a print program) of the present embodiment are stored.

Note that peripheral devices including a display such as a liquid crystal display (LCD) panel, an organic EL panel, or the like, a touch panel, and various buttons that are provided in the ATM, etc., may also be connected to the host device 1.

System Configuration of Card Printer 2

The card printer 2 is provided with a printing portion 20 and a hopper H.

The printing portion 20 constitutes the card printer 2 having the functions of frameless printing, duplex printing, color printing, and the like, which are the printing to be performed on a new card C. The printing portion 20 corresponds to a thermal transfer printer or a dye-sublimation printer, for example, and is capable of printing photographic quality images and characters. Specifically, the printing portion 20 includes a circuit and a mechanism of a print head such as a thermal head, and prints a colored bitmap image at a resolution of several hundreds of dpi. The thermal head is, for example, a heater array for melting or sublimating ink contained in an ink ribbon, and fixing the ink to the card C.

In the present embodiment, an example will be described in which the printing portion 20 performs printing with an ink ribbon by a thermal fusion method. The ink ribbon according to the present embodiment is, for example, a dye-sublimation or thermal transfer ink ribbon for performing character printing (printing) on the card C in color or in black and white. Furthermore, in the present embodiment, the ink ribbon may be a color ink ribbon including yellow, magenta, cyan, and black films. The color ink ribbon may further include a film of an overcoat to protect a printing surface.

Note that the ink ribbon may be a ribbon including only black, or a special ribbon which yields an anti-counterfeit color containing special metal particles, etc., a metallic color, a fluorescent color, or a hologram, for example (hereinafter referred to as a "special color"). In addition, the ink ribbon may be, for example, a multi-time ink ribbon (that can be used multiple times). By the above feature, in the present embodiment, the printing portion 20 may be enabled to also perform printing by using a special ink ribbon which yields a metallic color, a fluorescent color, a hologram, or an overcoat, for example (hereinafter referred to as "special color printing").

Further, the printing portion 20 is provided with a control portion for performing control over conveyance and reading/writing of the card C, in accordance with a received command, and a recording medium.

Of the above, the control portion is a control arithmetic portion including a CPU, an MPU, a GPU, a DSP, an ASIC, and the like, which control the respective parts of the card printer 2. Further, the control portion includes therein a non-transitory recording medium for storing a control program, and various kinds of data including encrypted data. While the recording medium includes, for example, a RAM and a ROM, a storage capacity of the recording medium does not need to be greater than that of the storage portion 11 of the host device 1.

The hopper H is, for example, a hopper unit in which new cards C that have not been issued yet are accommodated. In the present embodiment, a plurality of hoppers H may be incorporated into the card printer 2. In addition, the type of the card C to be accommodated may be varied for each hopper H. In this case, the hoppers H are switched by the control from the host device 1, and the hopper H can discharge the accommodated card C toward the printing portion 20 along an internal conveyance path.

Note that a card reader, which is capable of taking the card C inside the device by motor drive, and reading the card C or writing on the card C, may be connected to the host device 1. In this case, the card reader may be enabled to perform, for example, reading/writing of the IC chip, and reading/writing of the magnetic stripe.

Functional Configuration of Card Issuing System X

Next, a functional configuration for making the setting of printing on the card C in the card issuing system X according to an embodiment of the present invention will be described.

The control portion 10 of the host device 1 includes a print image generation portion 100, an overcoat image generation portion 110, and a combining portion 120.

The storage portion 11 stores print data 300 and overcoat data 310.

The print image generation portion 100 generates the print data 300 to perform printing on a card.

The overcoat image generation portion 110 generates the overcoat data 310, which is data on an overcoat for the print data 300 generated by the print image generation portion 100.

In the present embodiment, the overcoat image generation portion 110 applies the overcoating on the basis of pixels to be printed by the print data 300, for an area where a design quality is required in the print data 300. That is, for an area where a design quality is required, for example, the overcoat image generation portion 110 generates the overcoat data 310 which is set according to nontransparent pixels which are to be printed and output. Here, the pixels to be printed and output refer to the pixels of the print data 300 corresponding to a place where heat is applied by the heater array of the thermal head, for example, and the ink adheres to the card C.

Also, in the present embodiment, the overcoat image generation portion 110 generates, for an area where durability is required in the print data 300, the overcoat data 310 with which overcoating that covers the area is performed. That is, for the area where durability is required, for example, the overcoat image generation portion 110 generates the overcoat data 310 by which an entire area of a rectangular shape or the like is subjected to overcoating.

In doing so, the overcoat image generation portion 110 can determine, for each piece of the print data 300 to be combined among a plurality of pieces of the print data 300, whether to apply the overcoating based on pixels, or apply the overcoating which covers the area. Further, in the case of performing the overcoating based on pixels, the overcoat image generation portion 110 generates the overcoat data 310 which is set to perform the overcoating on the basis of the pixels of a character or a logo included in the print data 300.

Furthermore, the overcoat image generation portion 110 can acquire the setting of the card C accommodated in the hopper H of the card printer 2, and change the strength of a coating for each card according to the acquired setting.

The combining portion 120 combines at least either of a plurality pieces of the print data 300 and a plurality of pieces of the overcoat data 310. In this case, the combining portion 120 combines pieces of the overcoat data 310, which are generated by the overcoat image generation portion 110 correspondingly to respective pieces of the print data 300, and are set to apply the overcoating based on pixels or to cover the area. Note that the area of the present embodiment includes ones in units of objects, based on pixels other than a rectangular shape.

Meanwhile, in the present embodiment, the printing portion 20 of the card printer 2 acquires the print data 300 generated by the print image generation portion 100, and the overcoat data 310 generated by the overcoat image generation portion 110, and performs printing. In this case, the printing portion 20 selects the hopper H, and the card C accommodated in the selected hopper H is printed.

The print data 300 is image data and the like used for printing. In the present embodiment, a plurality of pieces of the print data 300 are rendered and combined. Each piece of the print data 300 includes common print data to be printed in common on the card C, or individual print data to be printed individually such as a card number or a membership number, and the like. For example, in the common print data, a common print image to be printed in common on the card is rendered. Further, in the individual print data, individual print images representing information which is necessary for printing and is different for each printing, such as the membership number and the name, are rendered. Here, the characters to be rendered in each piece of the print data 300, an image which serves as a print pattern having common contents (hereinafter referred to as a "logo"), and a material image including other common images, for example, are separately stored in the storage portion 11 as data of an image and an object. Further, metadata, which indicates whether a design quality is required or durability is required regarding an object to be rendered, etc., may be set on the print data 300.

In the present embodiment, a format (form) of the print data 300 may indicate, for example, the size of the card C and the scale of dpi (dots per inch), and the print data 300 may be bitmap data of the colors of C (Cyan), M (Magenta), Y (Yellow), and K (blacK or Key plate) corresponding to the ink ribbon of the card printer 2, or the colors of R (Red), G (Green), and B (Blue), in which the bitmap data has, for example, 8 bit (0 to 255) levels of gradation for each color. The bitmap data may be specified such that a transparent color is indicated at a gradation level of "0" or "255", for example. Alternatively, the print data 300 may be, for example, data of an electronic document in PDL (Page Description Language), PS (PostScript), PDF (Portable Document Format), or the like, a file of a word processor or an application such as a spreadsheet, or bitmap data in which the above kinds of data and file are rendered. Also, an image which constitutes a print pattern may also be a bitmap, electronic document data, a file of an application, and the like, as described above.

The overcoat data 310 is, for example, image data corresponding to a film of an overcoat of the ink ribbon. In the present embodiment, the overcoat data 310 may be, for example, bitmap data corresponding to two levels of gradation of "0" or "1". In the case of this example, "0" may indicate that overcoating is not to be performed, and "1" may indicate that overcoating is to be performed. That is, "0" may be specified to indicate a transparent color. In other words, in the present embodiment, as an overcoat based on pixels to be printed as described above, a setting of whether to perform the overcoating or not can be made for each pixel in the overcoat data 310. Further, in the present embodiment, also for the overcoat data 310, a plurality of pieces of data are rendered and generated with respect to respective pieces of the print data 300, and are combined at the time of printing.

Here, in the overcoat data 310, a value related to an overall coating strength when the overcoating is to be performed (hereinafter simply referred to as a "coating strength value") may be set. The coating strength value may be set in 8 bit (0 to 255) levels, for example. In this case, as the coating strength value of the combined overcoat data 310, a maximum value or a minimum value of the strength value of the respective pieces of the overcoat data 310 can be applied.

Here, the control portion 10 of the host device 1 is made to function as the print image generation portion 100 and the overcoat image generation portion 110 by executing the control program stored in the storage portion 11.

Also, each of the above-described components of the host device 1 and the card printer 2 serves as hardware resources which execute a printing method of the present embodiment.

Note that some of the above-described functional components or an arbitrary combination thereof may be configured as hardware by using an IC, programmable logic, a field-programmable gate array (FPGA), and the like.

Card Printing Processing by Card Issuing System X

Next, card printing processing by the card issuing system X according to an embodiment of the present invention will be described with reference to FIGS. 2 to 5.

In the card printing processing of the present embodiment, a printing application of the ATM, etc., is executed. At this time, card issuance is performed, and printing is conducted on the card C. Specifically, the print data 300 to perform printing on the card C is generated at the host device 1. Further, the overcoat data 310, which is data on an overcoat for the generated print data 300, is generated. In this case, the overcoat data 310, which is of a kind that causes an area where durability is required in the print data 300 to be subjected to overcoating which covers the area, and causes an area where a design quality is required to be subjected to overcoating based on the pixels to be printed by the print data 300, is generated. Then, the generated print data 300 and overcoat data 310 are combined, and printing is performed.

In the card printing processing of the present embodiment, the control portion 10, in the host device 1, executes the control program (not shown) stored in the storage portion 11, and the control means of each component, in the card printer 2, executes the control program (not shown) stored in the recording medium. The control program is executed in cooperation with the respective components, and by means of the hardware resources.

Figure 2:
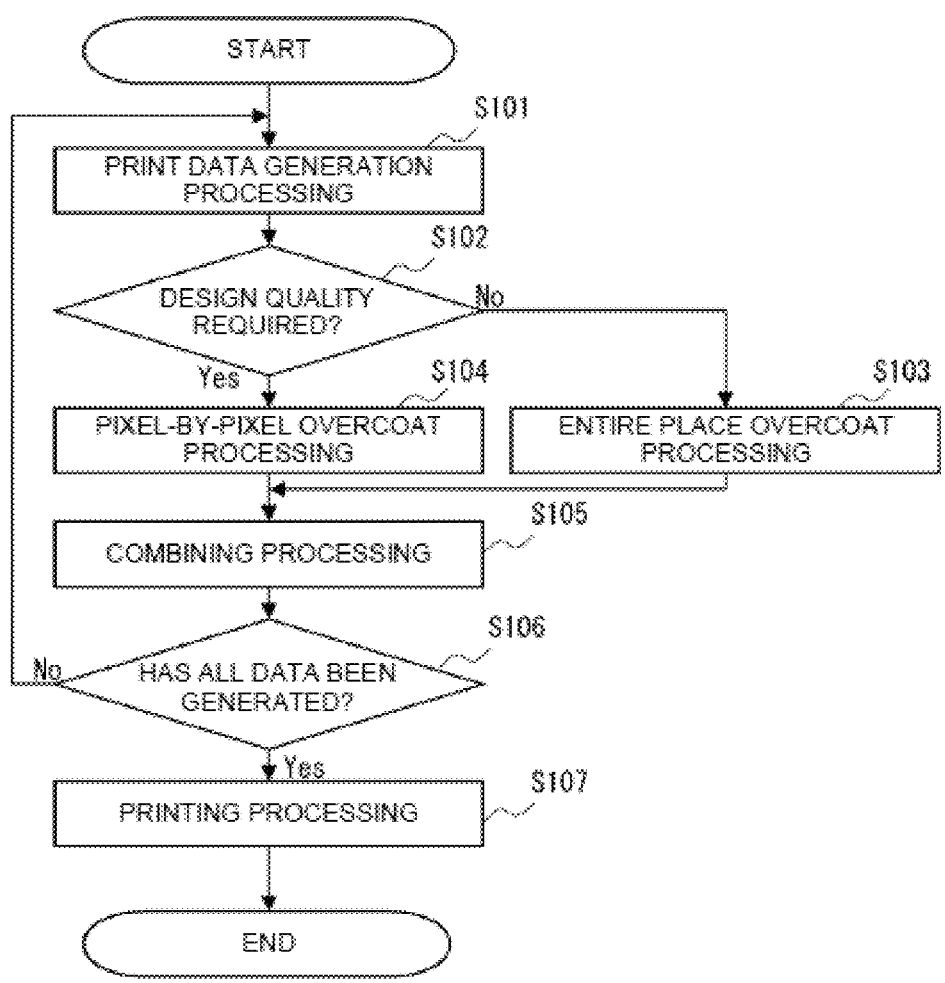
FIG. 2 is a flowchart of card printing processing according to the embodiment of the present invention.

In the following, the card printing processing of the present embodiment will be described step by step with reference to a flowchart of FIG. 2.

Step S101

First, the print image generation portion 100 performs print data generation processing.

The print image generation portion 100 generates the print data 300 to perform printing on the card C.

The print image generation portion 100 executes the application, and renders the print data 300 for the card to be issued. Here, in the present embodiment, a plurality of pieces of the print data 300 are stored in the storage portion 11, and are later combined as will be described below.

Therefore, the print image generation portion 100 may execute the application and render characters, logos, common images, and the like, on transparent image data, thereby generating each piece of the print data 300. In this case, as described above, the contents common to the respective pieces of the print data 300 may be prepared in advance.

Now referring to FIGS. 3 and 4, an example of generation of the print data 300 will be described.

Figure 3:
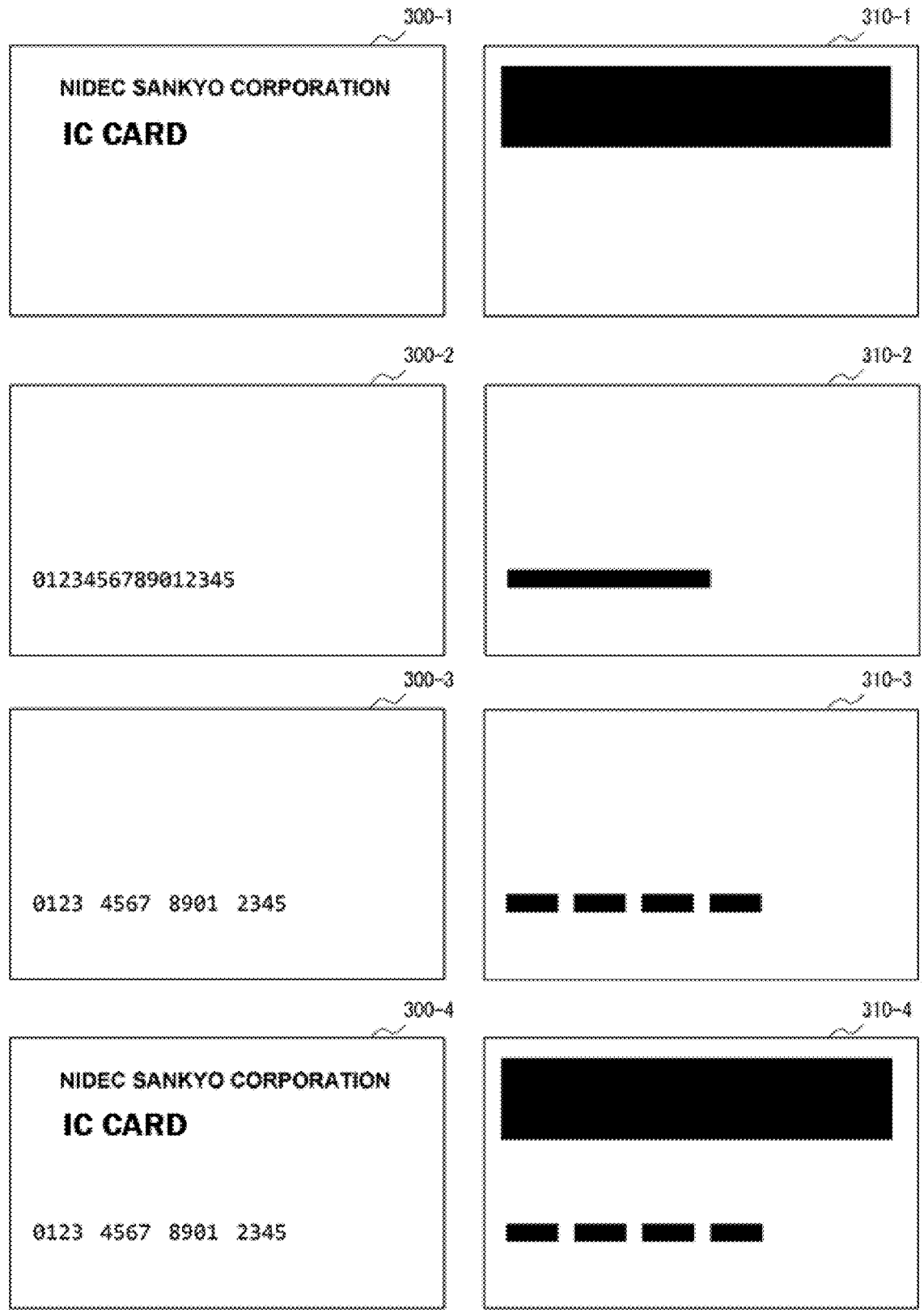
FIG. 3 is a conceptual diagram showing examples of print data and overcoat data in the card printing processing illustrated in FIG. 2.

Referring to FIG. 3, the print image generation portion 100 first generates the common print data in which common print images for use in printing are rendered. Print data 300-1 is an example in which the common print data, i.e., a logo and a material image such a common image, is rendered according to the type or the like of the card C.

Next, the print image generation portion 100 generates the individual print data in which individual print images, such as the membership number and the name, are rendered, in contrast to the common print image.

Print data 300-2 is an example in which an individual print image corresponding to the membership number is rendered. The print image generation portion 100 is capable of rendering image patterns side by side for each character in order to convert a number into an image.

Also, in the case of the membership number, or more specifically, the card number, etc., spacing may be inserted for each specific column. Print data 300-3 is an example in which an individual print image corresponding to the membership number having such spacing is rendered.

Figure 4:
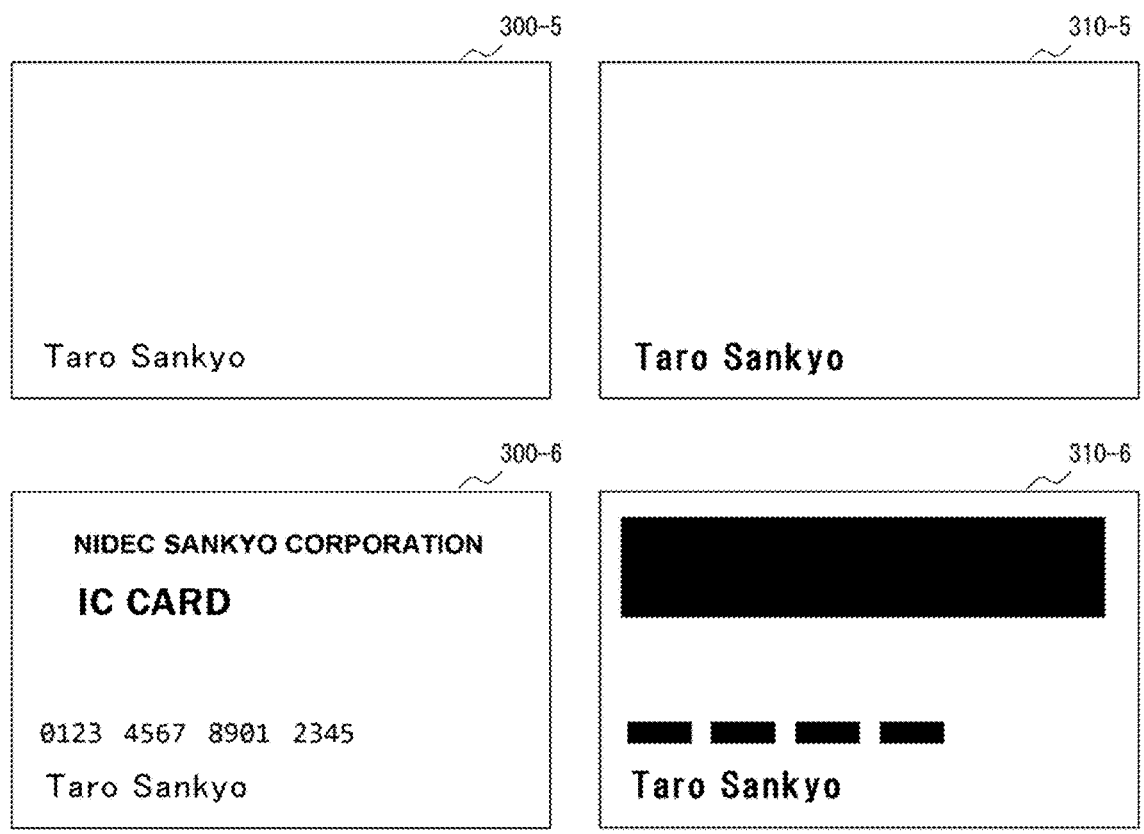
FIG. 4 is a conceptual diagram showing examples of the print data and the overcoat data in the card printing processing illustrated in FIG. 2.

Referring to FIG. 4, the print image generation portion 100 also generates the individual print data in which an individual print image corresponding to a name is rendered. A method of generating the above may be the same as the method for the individual print image corresponding to the membership number.

Print data 300-5 is an example in which the individual print image corresponding to a name is rendered.

Here, in the present embodiment, the print image generation portion 100 may set to the metadata of the print data 300-1 to 300-4 that durability is required as a prescribed value. Meanwhile, the print image generation portion 100 sets to the metadata of the print data 300-5 that a design quality is required.

Step S102

Next, the overcoat image generation portion 110 determines whether a design quality is required for the print data 300. In the present embodiment, the overcoat image generation portion 110 makes the above determination for each piece of the print data 300 to be combined among the plurality of pieces of the print data 300. If a rendered element corresponds to the print data 300 for which a design quality is required, the overcoat image generation portion 110 determines that "Yes" applies for step S102. The overcoat image generation portion 110 may make the determination on the basis of the metadata of the print data 300 in question. In a case other than the above, the overcoat image generation portion 110 determines that the print data 300 includes an area where durability is required, and makes a determination that "No" applies for step S102.

To be more specific, as regards names, importance may be placed on the look of them. In other words, a design quality is required. For this reason, if overcoat printing which covers a rectangular area is performed, a portion having an overcoat may become conspicuous depending on the type of the card. Therefore, in the case of an individual print image corresponding to a name, as in the example of the print data 300-5 described above, the overcoat image generation portion 110 determines that "Yes" applies for step S102.

Meanwhile, as regards information corresponding to the membership number, etc., there may be a need for stronger protection so that the information is not erased due to wear or the like through the card usage. In other words, it is determined that the print data 300 represents an area where durability is required. Therefore, in the case of the print data 300-2 or the print data 300-3 described above, the overcoat image generation portion 110 determines that "No" applies for step S102. Further, as regards a logo or a common image, etc., of the common print image, there may be a case where a design quality is not particularly required. In such a case, as a rule (a default), a determination that durability should preferably be given may be made. In the example described above, in the case of the print data 300-1, the overcoat image generation portion 110 determines that "No" applies for step S102.

If step S102 is "Yes", the overcoat image generation portion 110 causes the processing to proceed to step S104.

If step S102 is "No", the overcoat image generation portion 110 causes the processing to proceed to step S103.

Step S103

If it is determined that the print data 300 includes an area where durability is required, the overcoat image generation portion 110 performs entire area overcoat processing.

The overcoat image generation portion 110 generates the overcoat data 310, which is data on an overcoat for the print data 300 generated by the print image generation portion 100. In this step, the overcoat image generation portion 110 generates the overcoat data 310 which is of a kind that overcoating which covers the entire area is applied. Specifically, the overcoat image generation portion 110 detects an area of images in block from the targeted print data 300, for example, and generates the overcoat data 310 including a print pattern in which areas such as those of a rectangular shape in connection with the detected area are all set to "1". In detecting the area of images in block, the overcoat image generation portion 110 may acquire, for example, the length and the height of an object such as a character string or a figure, and use a function for generating a pattern of a rectangular shape, or the like. Note that apart from the rectangular areas, areas in the shape of an ellipse or a polygon, for example, may be covered.

In the example of FIG. 3, first, the overcoat image generation portion 110 generates the overcoat data 310 of a common overcoat print image, which is an image used for overcoat printing, in connection with the common print data. Overcoat data 310-1 is an example of the common overcoat print image.

Meanwhile, the overcoat image generation portion 110 assumes that an area of the overcoat for the individual print image corresponding to the membership number, as in the print data 300-2, is of a shape which covers by a rectangle covering the area of the character string of the membership number. In other words, for an area where durability is required, preferably, an overcoat area should be one that protects the entire character string. Accordingly, the overcoat image generation portion 110 generates the overcoat data 310 of a printed-portion-protection-prioritized overcoat image, which is an image that covers by a rectangle covering the area where the membership number is rendered. Overcoat data 310-2 is an example of the printed-portion-protection-prioritized overcoat image for such an individual print image corresponding to the membership number.

Also, as described above, in the membership number, spacing may be inserted for each specific column. In such a case, in the example of the print data 300-3, the print image generation portion 100 may first generate a print image of "0123". In this case, the overcoat image generation portion 110 generates an overcoat image for an area corresponding to "0123". Next, the print image generation portion 100 generates a print image for an area corresponding to "4567". Then, the overcoat image generation portion 110 generates an overcoat image for the area corresponding to "4567". The processing as described above may be repeated to generate the print data 300-3 and overcoat data 310-3. Alternatively, the print data 300-3 and the overcoat data 310-3 may be generated by combining the respectively generated images, such as "0123", "4567", . . . , separately in the same way as that described below.

Step S104

If a design quality is required in the print data 300, the overcoat image generation portion 110 performs pixel-by-pixel overcoat processing.

The overcoat image generation portion 110 causes the overcoating to be performed on a pixel-by-pixel basis, with reference to the pixels to be printed by the print data 300, for an area where a design quality is required in the print data 300. Accordingly, the overcoat image generation portion 110 generates the overcoat data 310 by which the overcoating is performed on the basis of the pixels of a character or a logo included in the print data 300. Specifically, the overcoat image generation portion 110 generates the overcoat data 310 of a kind that in the targeted print data 300, for example, a place where pixels are rendered regardless of the color, that is, a pixel at a nontransparent place, is set to "1". Then, the overcoat image generation portion 110 performs emphasis processing, or the so-called bold (bold type) processing, and also sets the pixels around the pixel at the place that is set to "1" to "1". In other words, it is possible to perform the processing of setting, for example, a place of a pixel, which is adjacent to a pixel set to "1" on the upper, lower, left, and right sides, to "1", and repeating the above by shifting the position by several pixels.

The overcoat image generation portion 110 stores the generated overcoat data 310 in the storage portion 11.

In the example of FIG. 4, in the case of the individual print image corresponding to a name, as in the print data 300-5, the overcoat image generation portion 110 generates the overcoat data 310 conforming to the shape of the characters. In other words, the overcoat image generation portion 110 generates a design-prioritized overcoat image which covers a place in the shape of characters, on the basis of the individual print image corresponding to a name. Overcoat data 310-5 is an example of such a design-prioritized overcoat image.

Step S105

Here, the combining portion 120 performs combining processing.

The combining portion 120 combines a plurality of pieces of the print data 300. In addition, the combining portion 120 combines a plurality of pieces of the overcoat data 310. In this case, as will be described below, respective pieces of data may be combined in stages. In combining the respective pieces of the print data 300, the combining portion 120 is capable of executing processing which causes, for pixels of an image on a combining side in which the image is transparent when the pixel value is "0" or the image is other than white when the pixel value is "255", the color of a pixel at the same position in an image on a combined side to be the same as the color of the pixel of the image on the combining side. Meanwhile, for the overcoat data 310, the combining portion 120 is capable of executing processing which causes, for pixels of an image on a combining side in which the pixel value is "0", the value to be the same as the value of a pixel at the same position in an image on a combined side, or processing like logical sum (OR).

Here, an example of combining a membership number having spacing will be described.

In the example of FIG. 3, first, the image combining portion 120 combines the print data 300-3 of the individual print image corresponding to the membership number having spacing, and the print data 300-1 of the common print image. As a result, the print data 300-4 of a membership-number-combined image is generated.

Similarly, the image combining portion 120 combines together the overcoat data 310-3 of the printed-portion-protection-prioritized overcoat image and the overcoat data 310-1 of the common overcoat print image. As a result, overcoat data 310-4 of a membership-number-portion-overcoat-combined image is generated.

Further, in the example of FIG. 4, the image combining portion 120 combines the print data 300-4 of the membership-number-combined-image, and the print data 300-5 of the individual print image corresponding to a name, and generates a final print image. The final print image is print data 300-6.

Similarly, the image combining portion 120 combines the overcoat data 310-5 of the design-prioritized overcoat image with the overcoat data 310-4 of the membership-number-portion-overcoat-combined image, and generates a final overcoat image. The final overcoat image is overcoat data 310-6.

In this example, the print data 300-6 of the final print image, and the overcoat data 310-6 of the final overcoat image are transmitted to the card printer 2.

Step S106

Here, the print image generation portion 100 determines whether or not generation of all data has been finished. When all pieces of the print data 300 have been generated, and pieces of the overcoat data 310 corresponding to the print data 300 have been generated and combined, the print image generation portion 100 determines that "Yes" applies for step S106. In a case other than the above, in other words, if the print data 300 still needs to be generated, the print image generation portion 100 determines that "No" applies for step S106.

If step S106 is "Yes", the print image generation portion 100 causes the processing to proceed to step S107.

If step S106 is "No", the print image generation portion 100 returns the processing to S101. In this way, other print data 300 and overcoat data 310 are generated.

Step S107

When all pieces of the print data 300 and the overcoat data 310 have been generated, and the combining is complete, the printing portion 20 performs printing processing.

The printing portion 20 receives the print data 300 and the overcoat data 310, which have been respectively combined, from the host device 1, and performs the printing. In the example described above, the print data 300-6 of the final print image, and the overcoat data 310-6 of the final overcoat image are received.

The printing portion 20 executes printing on a card by using the final print image and the final overcoat image which have been generated. That is, the printing portion 20 performs printing of the print data 300 generated by the print image generation portion 100, and the overcoat data 310 generated by the overcoat image generation portion 110 on the card C.

In this case, the printing portion 20 selects the hopper H in which the card C is stored, in accordance with an instruction by a command of the host device 1. The type of the card C to be printed is thereby selected.

Figure 5:
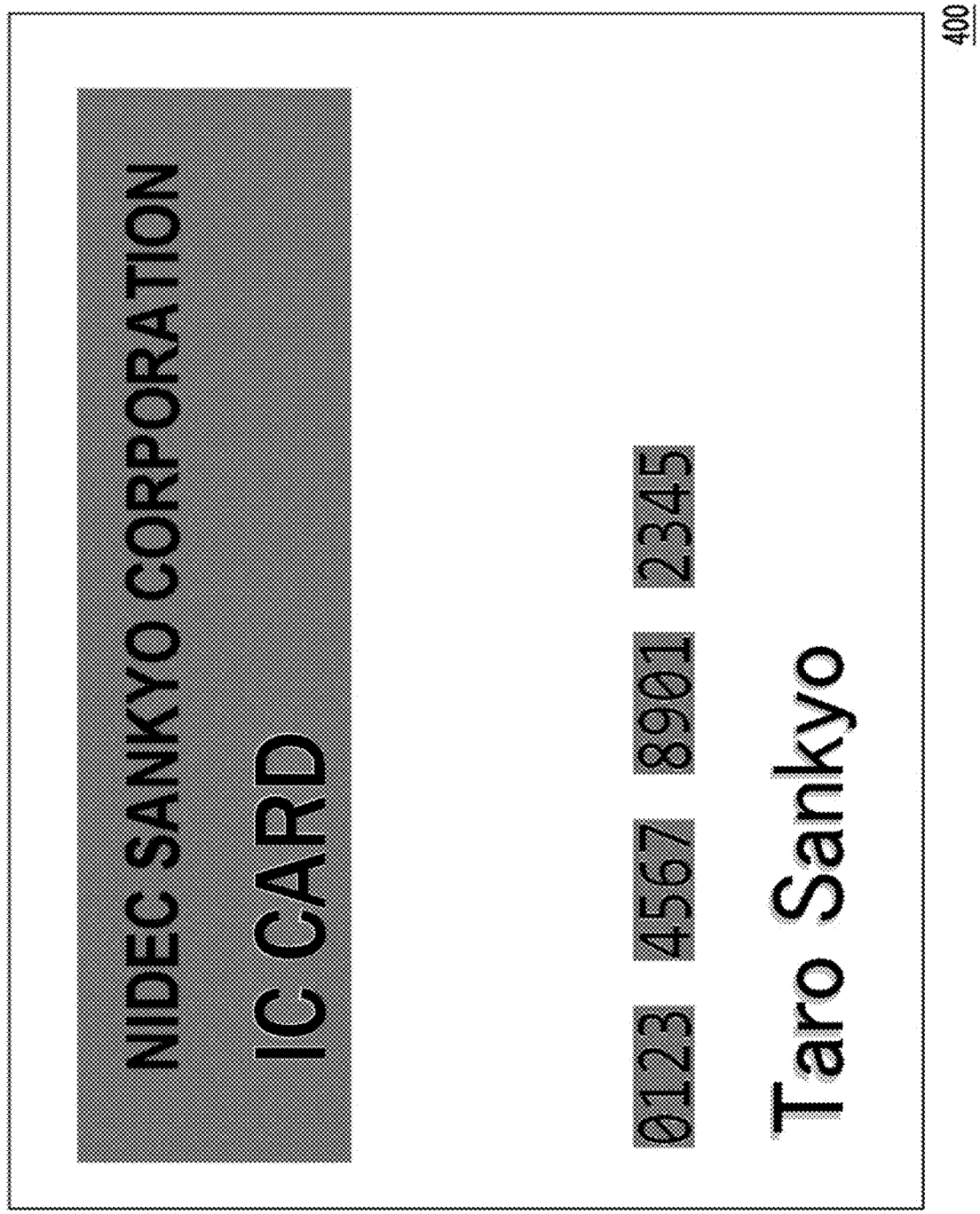
FIG. 5 is a conceptual diagram showing an example of printing on a card in the card printing processing illustrated in FIG. 2.

A print example 400 of FIG. 5 is an example of a print image in which printing of the respective pieces of the print data 300 and the overcoat data 310 is performed in the examples of FIGS. 3 and 4 described above. In this example, a portion in gray indicates a place subjected to overcoating. Also, in this example, an area where the name is indicated at which a design quality is required is subjected to overcoating on the basis of pixels.

Here, in performing the overcoat printing, the printing portion 20 acquires the setting of the card C accommodated in the hopper H from setting data (not shown) in the recording medium of the host device 1 or that incorporated in the printing portion 20. The printing portion 20 is capable of changing the strength of a coating for each card C according to the acquired setting. In this case, the printing portion 20 also refers to the coating strength value of the combined overcoat data 310, and changes the strength of the coating accordingly. The printing portion 20 can change the strength of a coating as described above by means of heat applied to a head or by changing a feed speed of the ink ribbon, for example.

By completion of the above steps, the card printing processing according to an embodiment of the present invention is ended.

Main Advantages of Present Embodiment

With the configuration described above, the following advantages can be obtained.

Conventionally, in performing printing on a card by the card printer 2, a printed part is protected by covering a print area with a transparent printing layer by means of overcoat printing. However, in recent years, various types of cards are being issued. Under these circumstances, depending on the type of the card, an overcoat printed part of the card, even though the overcoat is transparent, becomes conspicuous, and the design quality may be impaired in some cases.

Meanwhile, conventionally, overcoat printing has been performed for the entire printing surface, or an area which covers all the range expected to be printed in advance. Moreover, in the technology of JPH10-202926 A, only an area conforming to a print range is designated as an overcoat print area. Thus, the above technology is inherently not adapted to an image for which a design quality is required.

In contrast, the card issuing system X according to an embodiment of the present invention pertains to a card issuing system which issues cards, and includes: a print image generation portion 100 which generates the print data 300 to perform printing on the card C; an overcoat image generation portion 110 which generates the overcoat data 310, which is data on an overcoat for the print data 300 generated by the print image generation portion 100; and the printing portion 20 which performs printing of the print data 300 generated by the print image generation portion 100, and the overcoat data 310 generated by the overcoat image generation portion 110 on the card C, in which the overcoat image generation portion 110 is characterized by generating the overcoat data 310 with which an area where a design quality is required in the print data 300 is subjected to overcoating based on pixels to be printed by the print data 300, and an area where durability is required in the print data 300 is subjected to overcoating which covers the area.

With such a configuration, the overcoat data is generated on the basis of the pixels in accordance with a print area which protects an area of the overcoat printing. A design quality of the card can thereby be pursued without sacrificing the protective function of a printed part. That is, it becomes possible to perform printing of an overcoat which is excellent in the design quality and durability.

In addition, in the case of a card for which a design quality is required, if overcoat printing can be performed in such a way that the overcoat printing does not extend beyond a print range as far as possible, an overcoat printed part will not be conspicuous. However, from the standpoint of protection of a printed part, which is the original objective, the larger the area that the overcoat printing extends beyond the print range is, the greater the advantage is in the protection.

For this reason, if the overcoat printing is performed in accordance with a print range based on the pixels for all pieces of the print data 300, a problem may occur in the durability.

With respect to the above, the card issuing system X of the present embodiment performs, for an area where a design quality is required in the print data 300, overcoating on the basis of the pixels to be printed, and performs, for an area where durability is required, overcoating which covers the area. By virtue of this feature, the card issuing system X of the present embodiment is adaptable even in a case where durability must be satisfied, and printing which provides the required durability can be performed.

The card issuing system X according to an embodiment of the present invention further includes the combining portion 120 which combines at least either of a plurality pieces of the print data 300 and a plurality of pieces of the overcoat data 310, and is characterized in that the overcoat image generation portion 110 determines, for each piece of the print data 300 to be combined among the plurality of pieces of the print data 300, whether to perform the overcoating based on the pixels, or perform the overcoating which covers the area, and the combining portion 120 combines pieces of the overcoat data 310 corresponding to the respective pieces of the print data 300.

By such a configuration, it is possible to select whether to perform the overcoating on the basis of pixels or on the basis of an area in units of the print data 300. Consequently, the processing of the overcoat data 310 can be made more efficient and faster. In addition, by being able to specify a plurality of various patterns as areas for overcoat printing in the same print, printing of overcoats can be made more efficient.

The card issuing system X according to an embodiment of the present invention is characterized in that the overcoat image generation portion 110 generates the overcoat data 310 which applies, for the area where a design quality is required, an overcoat based on pixels of a character or a logo included in the print data 300.

By such a configuration, overcoating can be performed on the basis of the pixels of the character or the logo, and an overcoat can be applied without impairing the design quality.

OTHER EMBODIMENTS

In the above-described embodiment, an example in which a design quality is required for the case of a name has been described. However, an embodiment may be configured such that overcoating is performed on the basis of pixels in the other areas as well where a design quality is required. In this case, when the print data 300 is rendered, for example, metadata indicating whether a design quality is required or durability is required may be set. For example, for a pattern of a card featured in the design quality, as the print data 300 of a common print image, overcoating may be performed on the basis of pixels. Alternatively, also for the print data 300 with which a logo and other images are printed, for example, a setting that a design quality is required can be made according to an intention of an issuer of the card C. In this case, when the print data 300 is rendered, for example, the setting can be made in metadata, etc., indicating whether a design quality is prioritized or durability is required. Furthermore, it is possible to employ a configuration in which the point whether a design quality is required or durability is required can be specified in units of areas or objects in the print data 300. In addition, the size and the resolution of the print data 300 itself may be set arbitrarily, except for those related to the combined final print image and final overcoat image.

Further, in the above-described embodiment, an example has been described in which the durability of an overcoat is changed depending on the case where the overcoating is performed on the basis of pixels, and the case where the overcoating is performed such that an area is covered. In addition to the above, an example has been described in which the coating strength value of the overcoat data 310 is set to further change the strength of the overcoat.

Meanwhile, it is also possible to employ a configuration in which the coating strength value of the overcoat data 310 is not used.

Conversely, a value such as the coating strength value of the overcoat data 310 may be made variable to make the strength of the overcoat more adjustable. In this case, for example, the coating strength value of the overcoat data 310 may be changed according to an area of the portion for performing the overcoating based on the pixels in the overcoat data 310 of the final overcoat image. Specifically, for example, if a proportion of the area of the portion for performing the overcoating based on the pixel is large, the coating strength value of an overcoat may be made greater than usual. By the above feature, even in a case where overcoating based on pixels is performed abundantly, durability can be increased.

Alternatively, the card issuing system X according to another embodiment of the present embodiment may be characterized in that the overcoat image generation portion 110 acquires the setting of the card accommodated in the hopper, and changes the strength of the coating for each card according to the acquired setting.

With such a configuration, whether a design quality is required or durability is required may be determined for each hopper H. By the above feature, it is possible to achieve an overcoat strength as appropriate according to the card. For example, for a premium card such as the Platinum Card or the Gold Card for which a design quality is required, overcoating based on pixels can be performed, or the coating strength value can be reduced. In other words, the strength of the coating can be changed for each card according to the design quality requirement.

Note that in the case of a configuration in which the cards accommodated in the hopper H are different one by one, the order in which the cards are output, the type of the cards, and the like, can be set in the storage portion 11, for example, and the coating strength value of the overcoat can be set for each card.

In the above-described embodiment, an example has been described in which the overcoat data 310 is 2 bitmap data indicating the values of "0" and "1".

However, the overcoat data 310 may also be 8-bit bitmap data or the like. Alternatively, even if individual pieces of the overcoat data 310 are 2-bit data, the combined overcoat data 310 may be, for example, 8-bit bitmap data. In such an example, the coating strength value of each piece of the overcoat data 310 before being combined may be applied as a gradation level of the corresponding pixel.

By such a configuration, the strength defined in the overcoat data 310 can be changed, for example, in units of characters, in units of images, and in units of rectangular areas, on the basis of pixels. Accordingly, the strength of an overcoat can be changed with flexibility, and overcoating of the strength intended by a card issuer is enabled.

Also, in the above-described embodiment, an example has been described in which 8-bit data is used in each gradation level as an image. However, the data may be of 16 bits or 32 bits, or in other formats.

In the above-described embodiment, an example of a system in which the host device 1 and the card printer 2 are connected to each other has been described, as the card issuing system X.

Figure 6:
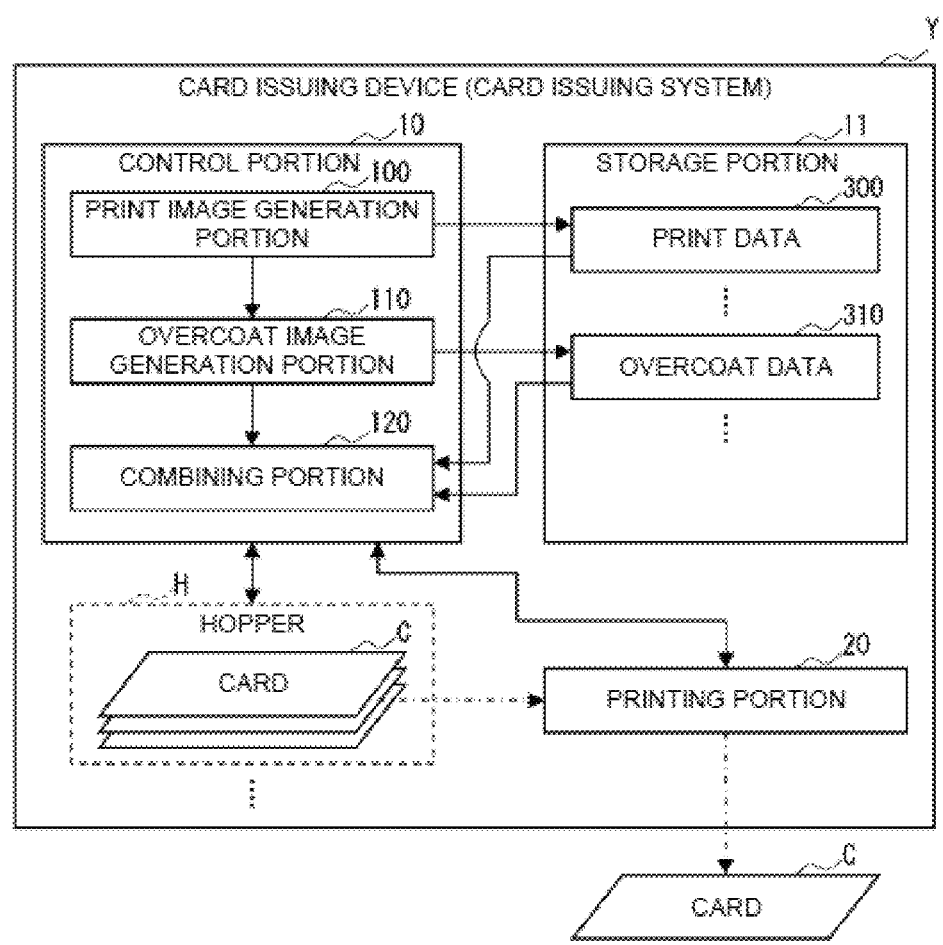
FIG. 6 is a diagram illustrating a system configuration of a card issuing system according to another embodiment of the present invention.

Referring to FIG. 6, however, it is also possible to have each of the above-described configurations realized by a card issuing device alone, as a card issuing system Y. In such a case, each of the above-described processes may be performed by a control portion of the card issuing device, and printing including overcoating may be enabled in the so-called stand-alone manner.

By such a configuration, it becomes possible to achieve the overcoat printing in which both the design quality and durability are satisfied, in accordance with the flexible configuration.

In the above-described embodiment, an example has been described in which the printing portion 20 corresponds to a printing portion which uses an ink ribbon.

However, the printing portion 20 may be an inkjet printer, an electronic dry photo printer, a laser engraver printer, a fusion or UV-curing 3D printer, or the like, which is capable of performing printing of overcoats. Alternatively, a method of melting, after performing the printing by other schemes, only a film of an overcoat or a liquid resin by means of a laser, an LED array, an MEMS mirror, a fusion head, or the like, may be employed. Even in such cases, at least an embodiment of the present invention can be applied in performing printing of an overcoat.

It is needless to say that the configurations and operations of the above embodiments are merely examples, and may be modified and implemented as appropriate without departing from the spirit and scope of the embodiments of the present invention.

What is claimed is:

1. A card issuing system which issues cards, the card issuing system comprising:
   a print image generation portion which generates print data to perform printing on the card;
   an overcoat image generation portion which generates overcoat data, which is data on an overcoat for the print data generated by the print image generation portion; and
   a printing portion which performs printing of the print data generated by the print image generation portion, and the overcoat data generated by the overcoat image generation portion on the card, wherein
   the overcoat image generation portion generates the overcoat data with which an area where a design quality is required in the print data is subjected to overcoating based on pixels to be printed by the print data, and an area where durability is required in the print data is subjected to overcoating which covers the area where durability is required.

2. The card issuing system according to claim 1, further comprising a combining portion which combines at least either of a plurality of pieces of the print data and a plurality of pieces of the overcoat data, wherein
   the overcoat image generation portion determines, for each piece of the print data to be combined among the plurality of pieces of the print data, whether to perform the overcoating based on the pixels, or perform the overcoating which covers the area, and
   the combining portion combines pieces of the overcoat data corresponding to the respective pieces of the print data.

3. The card issuing system according to claim 2, wherein the overcoat image generation portion generates the overcoat data which applies, for the area where a design quality is required, an overcoat based on pixels of a character or a logo included in the print data.

4. The card issuing system according to claim 3, wherein the overcoat image generation portion acquires a setting of the card accommodated in a hopper, and changes a strength of a coating for each of the cards according to the acquired setting.

5. The card issuing system according to claim 2, wherein the overcoat image generation portion acquires a setting of the card accommodated in a hopper, and changes a strength of a coating for each of the cards according to the acquired setting.

6. The card issuing system according to claim 1, wherein the overcoat image generation portion generates the overcoat data which applies, for the area where a design quality is required, an overcoat based on pixels of a character or a logo included in the print data.

7. The card issuing system according to claim 6, wherein the overcoat image generation portion acquires a setting of the card accommodated in a hopper, and changes a strength of a coating for each of the cards according to the acquired setting.

8. The card issuing system according to claim 1, wherein the overcoat image generation portion acquires a setting of the card accommodated in a hopper, and changes a strength of a coating for each of the cards according to the acquired setting.

9. A non-transitory computer-readable storage medium storing a print program executed in a card issuing system which issues cards, the print program for the card issuing system causing the card issuing system to:

generate print data to perform printing on the card;

generate overcoat data, which is data on an overcoat for the print data that has been generated;

generate the overcoat data with which an area where a design quality is required in the print data is subjected to overcoating based on pixels to be printed by the print data, and an area where durability is required in the print data is subjected to overcoating which covers the area where durability is required; and perform printing of the print data and the overcoat data that have been generated.

10. A printing method executed by a card issuing system which issues cards, in which the card issuing system performs the printing method, the printing method of the card issuing system comprising:

generating print data to perform printing on the card;

generating overcoat data, which is data on an overcoat for the print data that has been generated;

generating the overcoat data with which an area where a design quality is required in the print data is subjected to overcoating based on pixels to be printed by the print data, and an area where durability is required in the print data is subjected to overcoating which covers the area where durability is required; and performing printing of the print data and the overcoat data that have been generated on the card.

* * * * *